(No Model.)
J. E. NYROP.
MILKING MACHINE.
No. 338,098. Patented Mar. 16, 1886.
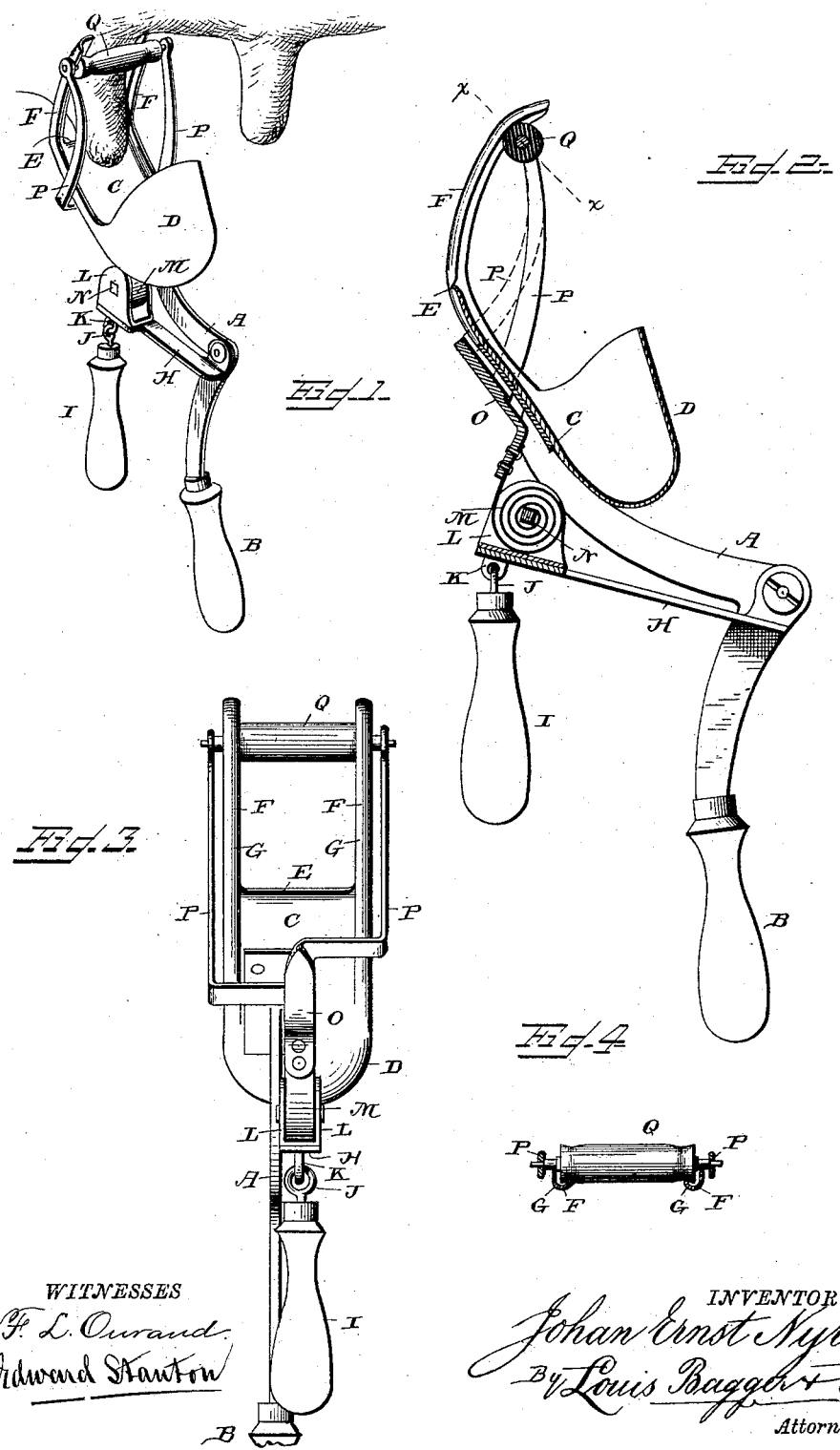
WITNESSES
F. L. Durand
Edward Stanton
INVENTOR
Johan Ernst Nyrop
By Louis Bagger & Co.,
Attorneys

UNITED STATES PATENT OFFICE.

JOHAN ERNST NYROP, OF COPENHAGEN, DENMARK.

MILKING-MACHINE.

SPECIFICATION forming part of Letters Patent No. 338,098, dated March 16, 1886.

Application filed December 4, 1885. Serial No. 184,719. (No model.)

*To all whom it may concern:*

Be it known that I, JOHAN ERNST NYROP, a subject of the King of Denmark, and residing at Copenhagen, in the Kingdom of Denmark, have invented certain new and useful Improvements in Milking-Machines; and I do declare the following to be a full, clear, and exact description of the invention, such as will enable others skilled in the art to which it appertains to make and use the same, reference being had to the accompanying drawings, which form a part of this specification, and in which—

Figure 1 is a perspective view of my improved milking-machine, showing it applied. Fig. 2 is a longitudinal sectional view of the same. Fig. 3 is a front view; and 4 is a cross-section on line $x$ $x$, Fig. 2.

Similar letters of reference indicate corresponding parts in all the figures.

My invention has relation to milking-machines; and it consists in the improved construction and combination of parts of a machine, in which the teat or teats of the cow are pressed between a plate and a reciprocating yielding roller, as hereinafter more fully described and claimed.

In the accompanying drawings, the letter A indicates a flat bar bent at an angle and provided at its lower end with a handle, B, by means of which the apparatus may be held.

C is a plate which is secured to the upper end of the bar, and the edges of the lower end of this plate are bent and bulged to form a cup or receptacle, D, into which the milk may flow, the teat resting against the plate. The upper edge, E, of the plate is curved slightly outward, so as to present a rounded surface for the teat to rest against.

From the upper corners of the plate project two curved horns or arms, F, the said arms being curved inward, and these arms are corrugated to form grooves G, which extend at the side edges of the plate, the said grooves or corrugations serving to strengthen the arms and plate.

An arm, H, is pivoted at its inner end at the bend of the bar, and has a handle, I, hinged to its outer end, the said handle having an eye, J, engaging an eye, K, upon the end of the arm and the inner side of the outer end of the arm is provided with two inwardly-projecting flanges or lips, L L, between which a helical spring, M, is secured at one end upon a pin, N, passing through the lips. An arm, O, is secured to the outer free end of this spring, and the end of this arm is bifurcated to form two arms, P P, between the upper ends of which a roller, Q, is journaled. This roller is covered with rubber or similar yielding material, and is held against the inner sides of the arms F and the plate C by the spring, the ends of the roller being forced into the grooves in the arms of the plate and traveling in the same.

When the machine is to be used, the plate C is placed against the side of the teat, the teat projecting between the arms F of the plate, whereupon the pivoted arm having the roller journaled between its ends is drawn outward, causing the roller to travel along the horns and over the plate, pressing the milk out of the teat into the cup, from which it will run over the top into the pail or bucket, which is placed under the cow.

Having thus described my invention, I claim and desire to secure by Letters Patent of the United States—

1. In a milking-machine, the combination of a plate provided with inwardly-curved arms or horns at its upper corners, a yielding roller, and means for yieldingly pressing the said roller against the arms and plate and for reciprocating it over the arms and plate, as and for the purpose shown and set forth.

2. In a milking-machine, the combination of a plate provided with inwardly-curved arms or horns at its upper corners, and having the said arms and the side edges of the plate corrugated, with a yielding roller having means for pressing it yieldingly against the plate and for reciprocating it over the arms and plate, as and for the purpose shown and set forth.

3. In a milking-machine, the combination of a bent arm having a handle at its lower end and a plate at its upper end, formed with a cup at its lower end, and with inwardly-curved corrugated horns at its upper edges, an arm pivoted at the bend of the bent bar or arm, and having two inwardly-projecting lips at its outer end connected by means of a pin, a handle loosely attached to the outer end of the arm, a spring secured at one end to the pin between the lips, an arm secured to the free end of the spring and having bifurcated ends straddling the edges of the plate and horns, and a yielding roller journaled between the upper ends of the bifurcated arm traveling upon and bearing against the inner sides of the plate and its horns, as and for the purpose shown and set forth.

In testimony whereof I have hereto affixed my signature in presence of two witnesses.

JOHAN ERNST NYROP.

Witnesses:
LOUIS NYROP,
E. FAMENSKJOED.